US005561662A

United States Patent [19]
Kakuma et al.

[11] Patent Number: 5,561,662
[45] Date of Patent: Oct. 1, 1996

[54] SUBSCRIBER INFORMATION PROCESSING METHOD IN A CONNECTIONLESS DATA SERVICE

[75] Inventors: Satoshi Kakuma; Kazuo Hajikano; Masami Murayama; Shuji Yoshimura; Shiro Uriu; Jin Abe, all of Kanagawa, Japan

[73] Assignee: Fujitus Limited, Kanagawa, Japan

[21] Appl. No.: 210,149

[22] Filed: Mar. 17, 1994

[30]    Foreign Application Priority Data

Sep. 20, 1993  [JP]  Japan .................... 5-233461

[51] Int. Cl.⁶ ..................... H04L 12/56; H04L 12/26
[52] U.S. Cl. ............. 370/17; 370/60.1; 370/118
[58] Field of Search .............. 370/13, 17, 94.1, 370/99, 118, 60, 60.1, 61, 110.1, 94.2; 379/230, 114, 115, 113, 111; 341/51, 65, 95, 106; 364/550

[56]    References Cited

U.S. PATENT DOCUMENTS

| 4,545,032 | 10/1985 | Mak | 364/900 |
|---|---|---|---|
| 4,975,906 | 12/1990 | Takiyasu et al. | 370/94.1 |
| 5,007,048 | 4/1991 | Kowalk | 370/60 |
| 5,132,961 | 7/1992 | Thiebaut et al. | 370/13 |
| 5,140,588 | 8/1992 | Danner | 370/94.1 |
| 5,293,379 | 3/1994 | Carr | 370/94.1 |
| 5,315,580 | 5/1994 | Phaal | 370/94.1 |

*Primary Examiner*—Benedict V. Safourek
*Assistant Examiner*—Chau T. Nguyen

[57]    ABSTRACT

A switch interface unit, a monitor unit, and a control system interface unit are connected as external units to a highway to which a subscriber information processing unit is also connected so that a monitoring process, that is, a special study process, can be simplified and a cost charged for the subscriber information processing unit can be prevented from increasing greatly. Furthermore, in an accounting process, accounting parameters are accumulated in an accounting information accumulating unit for variations on compressed source addresses, not on source addresses. As a result, the accounting information accumulating unit, etc. can be realized with normal circuit elements only.

17 Claims, 8 Drawing Sheets

| | | | | | | |
|---|---|---|---|---|---|---|
| FIG.8A | H | P | H | P | H | P |

FIG.8B  | BOM | COM | EOM |

FIG.8H  | FOR SA COMPRESSING UNIT | FOR RAM CORRESPONDING TO VCT COMPRESSED SA | FOR RAM CORRESPONDING TO VCT COMPRESSED SA |

SUBSCRIBER INFORMATION PROCESSING METHOD IN A CONNECTIONLESS DATA SERVICE

BACKGROUND OF THE INVENTION

1. Field of the Invention

The present invention relates to a broadband connectionless data service provided to realize a local area network (LAN) interconnection, and more specifically to a subscriber information processing method in the service.

2. Description of the Related Art

For example, a switched multi-megabit data service (SMDS) is well-known as a broadband connectionless data service for the purpose of realizing a LAN interconnection.

An efficient process of subscriber information is a very important point in the broadband connectionless data service because a connectionless data service are handled for a large number of users.

Figure 1:
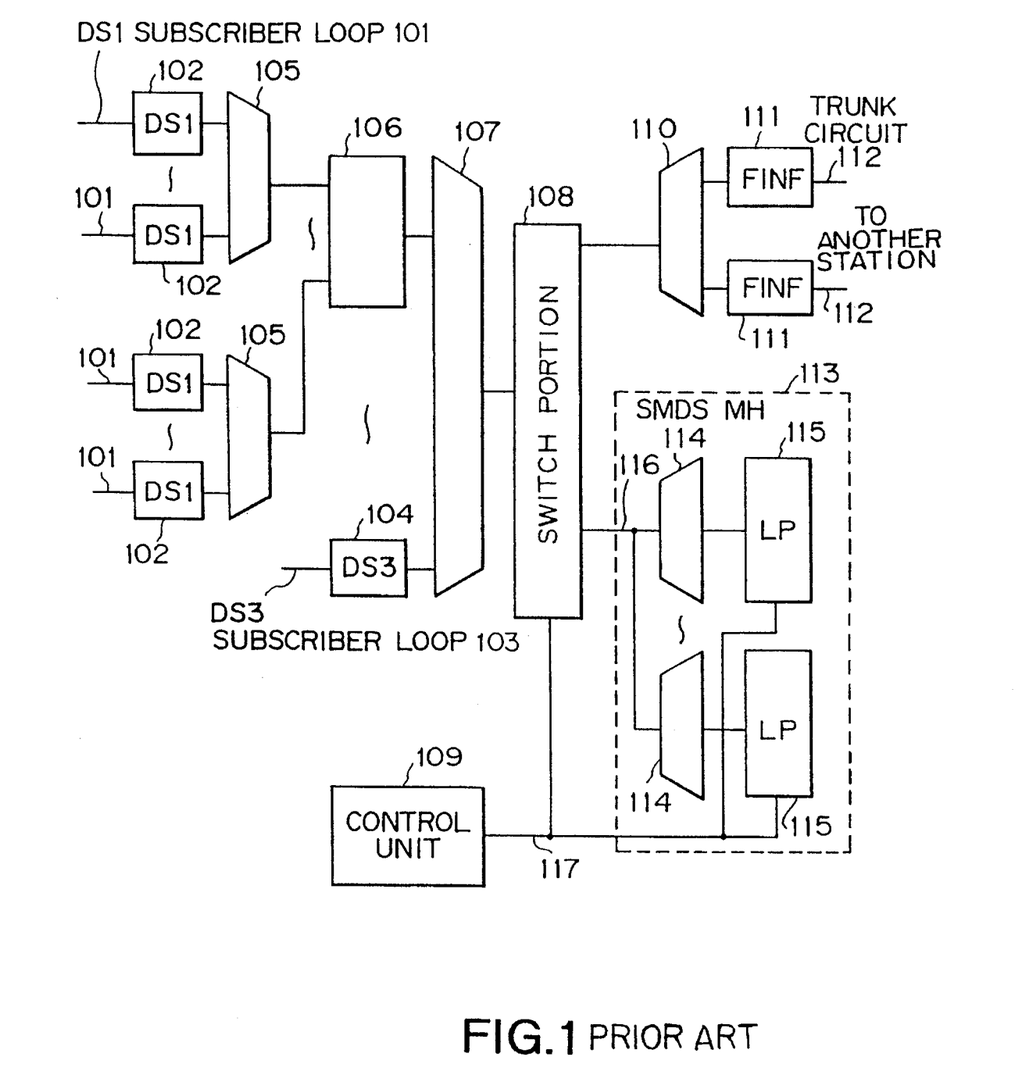
FIG. 1 shows the configuration of a typical SMDS system.

FIG. 1 shows the typical configuration of the SMDS system.

The SMDS refers to a connectionless data service based on an asynchronous transfer mode (ATM) system.

Subscriber information is processed through a subscriber network interface (SNI). A subscriber is provided with, for example, a DS1 subscriber loop 101 having a transmission rate of 1.5 Mbp (mega bits per second), and a DS3 subscriber loop 103 having a transmission rate of 45 Mbps. The DS1 subscriber loop 101 is connected to a DS1 terminating circuit 102, while the DS3 subscriber loop 103 is connected to a DS3 terminating circuit 104.

When communications are established through an SMDS, a cell transmitted from a subscriber is assigned a semi-permanent virtual channel identifier (VCI) and a virtual path identifier (VPI) pertaining to the SMDS. The DS1 terminating circuit 102 and the DS3 terminating circuit 104 extracts the cell assigned the semi-permanent VCI+VPI, replaces the VCI+VPI of the cell with a semi-permanent VCI+VPI pertaining to each terminal circuit, and outputs the cell to a switch unit 108.

The cell is inputted to the switch unit 108 through multiplexer/demultiplexer 105, 106 or 107. The switch unit 108 transmits to an SMDS message handler (SMDS-MH) 113 the cell assigned the semi-permanent VCI+VCP pertaining to the DS1 terminating circuit 102 or the DS3 terminating circuit 104.

The SMDS MH 113 is connected to the switch unit 108 through a highway 116 having a transmission rate of 622 Mbps. The SMDS-MH 113 comprises an interface 114 and a line processor (LP) 115, and can include 4 message shelves (MESH) at the maximum, each having the performance of 155 Mbps. One LP 115 can process subscriber information in DS1 subscriber loops 101 of 32 at the maximum permitted in the present station. Therefore, one SMDS-MH 113 can process subscriber information in a total of 128 (32×4) DS1 subscriber loops 101. The SMDS-MHs 113 of the number depending on the scale of its own station are connected to the switch unit 108 through the highway 116.

The LP 115 can recognize which terminating circuit the cell has been inputted from, the DS1 terminating circuit 102 or the DS3 terminating circuit 104, by determining the semi-permanent VCI+VPI assigned to the received cell. Then, the LP 115 extracts a source address SA from the message (packet) transmitted through a plurality of cells, and calculates a degenerated source address corresponding to the extracted address. Furthermore, the LP 115 extracts a destination address DA from the above mentioned message. If the destination address DA indicates the present station, the LP 115 replaces the VCI+VPI of each cell containing the message with a semi-permanent VCI+VPI indicating the DS1 terminating circuit 102 or the DS3 terminating circuit 104 in the present station corresponding to the destination address DA. On the other hand, if the destination address DA indicates a station other than the present station, then the LP 115 calculates an SMDS MH of the destination station, and replaces the VCI+VPI of each cell containing the above described message with a VCI+VPI pertaining to the degenerated source address and the SMDS-MH 113 of the destination station. The LP 115 also assigns information specific to an ATM method referred to as a tag to the head of each cell, which stores the above described message, so that each cell can be autonomously switched in the switch unit 108. Then, the LP 115 outputs each cell again to the switch unit 108 through the interface 114 and the highway 116.

Each switching module, not shown in the attached drawings, in the switch unit 108 switches an inputted cell at a high speed by determining the value of a tag assigned at the head of the cell.

At this time, the cell inputted from the SMDS-MH 113 is autonomously switched by the switch unit 108 according to the tag assigned to the cell if the cell is addressed to the present station. Then, it is transmitted to a subscriber in the present station via the DS1terminating circuit 102 or the DS3 terminating circuit 104, and the DS1 subscriber loop 101 or the DS3 subscriber loop 103 in the present station through multiplexer/demultiplexer 107, 106, or 105. If the cell is addressed to a station other than the present station, it is autonomously switched by the switch unit 108 according to the tag assigned to the cell. Then, it is transmitted to the SMDS-MH 113 of the destination station through the multiplexer/demultiplexer 110, a terminating circuit (FINF) 111, and a trunk circuit 112.

The LP 115 of the SMDS-MH 113 in the destination station recognizes that a message is addressed to the destination station by determining the destination address DA of the message transmitted to the destination station through a plurality of cells. Then, it replaces the VCI+VPI of each cell containing the message with a semi-permanent VCI+VPI of the DS1 terminating circuit 102 or the DS3 terminating circuit 104 in the present station corresponding to the destination address DA. Then, after assigning a tag to the head of each cell containing the message so that the cell is autonomously switched in the switch unit in the destination station, the LP 115 outputs the cell to the switch unit. After being autonomously switched in the switch unit according to the tag assigned to each cell, the cell is transmitted to a subscriber in the destination station through the DS1 terminating circuit 102 or the DS3 terminating circuit 104 via the DS1 subscriber loop 101 or the DS3 subscriber loop 103.

As described above, the DS1 terminating circuit 102 for terminating the DS1 subscriber loop 101, or DS3 terminating circuit 104 for terminating the DS3 subscriber loop 103 does not process subscriber information individually, but the SMDS-MH 113 collectively process all subscriber information, thereby reducing the cost required for the hardware of the entire switching unit and facilitating the maintenance of the unit. A control unit 109 only has to access the SMDS-MH 113 through a control line 117 in a calling process, etc., and need not access each of the DS1 terminating circuits 102 and the DS3 terminating circuits 104 separately. Thus, subscriber information can be processed effectively.

In a broadband connectionless data service such as an SMDS, etc., in addition to the above described normal cell transmission process, the function of monitoring the traffic state such as occurrences of errors, the frequency of errors, etc. must be necessarily performed by monitoring a lot of subscriber information (referred to as network parameters).

For example, a performance monitoring process is required to control the quality of a switching system, subscriber loop, terminal unit, inter-station relay line, and its interface, etc. In this process, for example, the contents of errors are monitored every fifteenth minute, and the number of the errors is notified to an operation center. The operation center recognizes the present quality according to the notification, and preliminarily maintains the quality before it indicates considerable deterioration.

Furthermore, a process referred to as a network data collection is also required. In this process, a parameter indicating the state of a switching system in specified traffic is monitored in time unit of over 15 minutes. After a subscriber has started actual communications, a larger influence is anticipated on another traffic if the predetermined amount of data processed by a subscriber has changed. Accordingly, based on a monitored parameter, each traffic is optimally planned for future use.

Since the above described performance monitoring process and network data collecting process are periodically performed for each subscriber, it is more efficient that the LP 115 in the SMDS-MH 113 shown in FIG. 1 for collectively performing subscriber information carries out the processes.

Furthermore, in a broadband connectionless data service such as an SMDS, etc., a process referred to as a special study is also required. In this process, specified subscriber information is monitored at a subscriber's request or to, according to a network provider, establish a network for future use or monitor the state of a route in which a problem will possibly occur. Each piece of subscriber information is monitored at predetermined intervals in the performance monitoring process and the network data collecting process, whereas an operator-inputted command controls the special study process according to the necessity described above.

As explained above, the special study process is not constantly performed. The process is charged with a larger load than a normal monitoring process because a monitoring process is carried out according to a command inputted by a maintenance staff for a longer time in the special study process.

Therefore, the special study process, which is not constantly performed, is charged with a larger load, and built in a normally provided SMDS MH, offers the problem that a total cost is raised, resulting in the raise of a unit cost charged for a line.

If the function of the special study process is built in the SMDS-MH 113 shown in FIG. 1, then a cost will be raised because the function should be provided for each subscriber.

On the other hand, a broadband connectionless data service such as an SMDS, etc. also requires an accounting process for each subscriber in addition to the monitoring process for a network parameter.

In an accounting process, subscriber information generated as a result of the communications of each subscriber must be collected for each subscriber individually.

In this case, account must be charged to communications data for which a network service is provided. Thus, the accounting process is performed at a destination station. Practically, the process is performed by the LP 115 in the SMDS-MH 113 (shown in FIG. 1) in the destination station.

Since a broadband connectionless data service such as an SMDS, etc. is a new network service, it has never been provided based on any accounting process. A possible accounting process is to collect and accumulate necessary subscriber information for the accounting process for each source address SA contained in a message addressed to a destination station.

However, a source address SA contained in a message is represented as, for example, 64-bit information, and the number of source addresses SA is 664 in all. It is actually impossible to accumulate such a large number of source addresses SA at each station.

SUMMARY OF THE INVENTION

The present invention has been developed based on the above described background, and aims at efficiently processing subscriber information.

That is, according to the first aspect of the present invention, a subscriber information processing system comprises a switch interface unit, provided in each station which performs a connectionless data process and connected as an optional external unit to a highway to which a subscriber information processing unit for processing subscriber information is connected, for selectively receiving a cell assigned a predetermined source or destination address from among cells inputted through the highway; and a monitor unit for performing a monitoring process on predetermined subscriber information in a cell inputted from the switch interface unit according to a predetermined instruction.

With the above described configuration, since a monitoring process should be performed by the switch interface unit and the monitor unit only on a specified source or destination address, the entire system configuration can be successfully simplified.

Furthermore, the rise in a cost can be prevented in a subscriber information processing unit.

On the other hand, according to the second aspect of the present invention, a subscriber information processing system comprises a source address extracting unit, provided in a station in which connectionless data process is performed, for extracting a source address from a cell addressed to a subscriber accommodated by the station; a source address compressing circuit for compressing a source address extracted by the source address extracting unit and outputting a compressed source address; an accounting information extracting unit for extracting from a received cell predetermined subscriber information as accounting information, and an accounting information storage unit for accumulating accounting information to be extracted by the accounting information extracting unit at an address corresponding to the compressed source address outputted by the source address compressing circuit.

With the above described configuration, the accounting information can be accumulated in the accounting information storage unit for addresses corresponding not to source addresses, but to compressed source addresses. Thus, the accounting information storage unit, etc. can be realized by normal circuit elements.

According to the first and second aspects of the present invention, subscriber information can be efficiently processed.

BRIEF DESCRIPTION OF THE DRAWINGS

One skilled in the art can easily understand additional features and objects of this invention from the description of the preferred embodiments and some of the attached drawings. In the drawings:

FIG. 8a–r is a timing chart showing the operation of the accounting unit according to the present invention.

DESCRIPTION OF THE PREFERRED EMBODIMENTS

Figure 2:
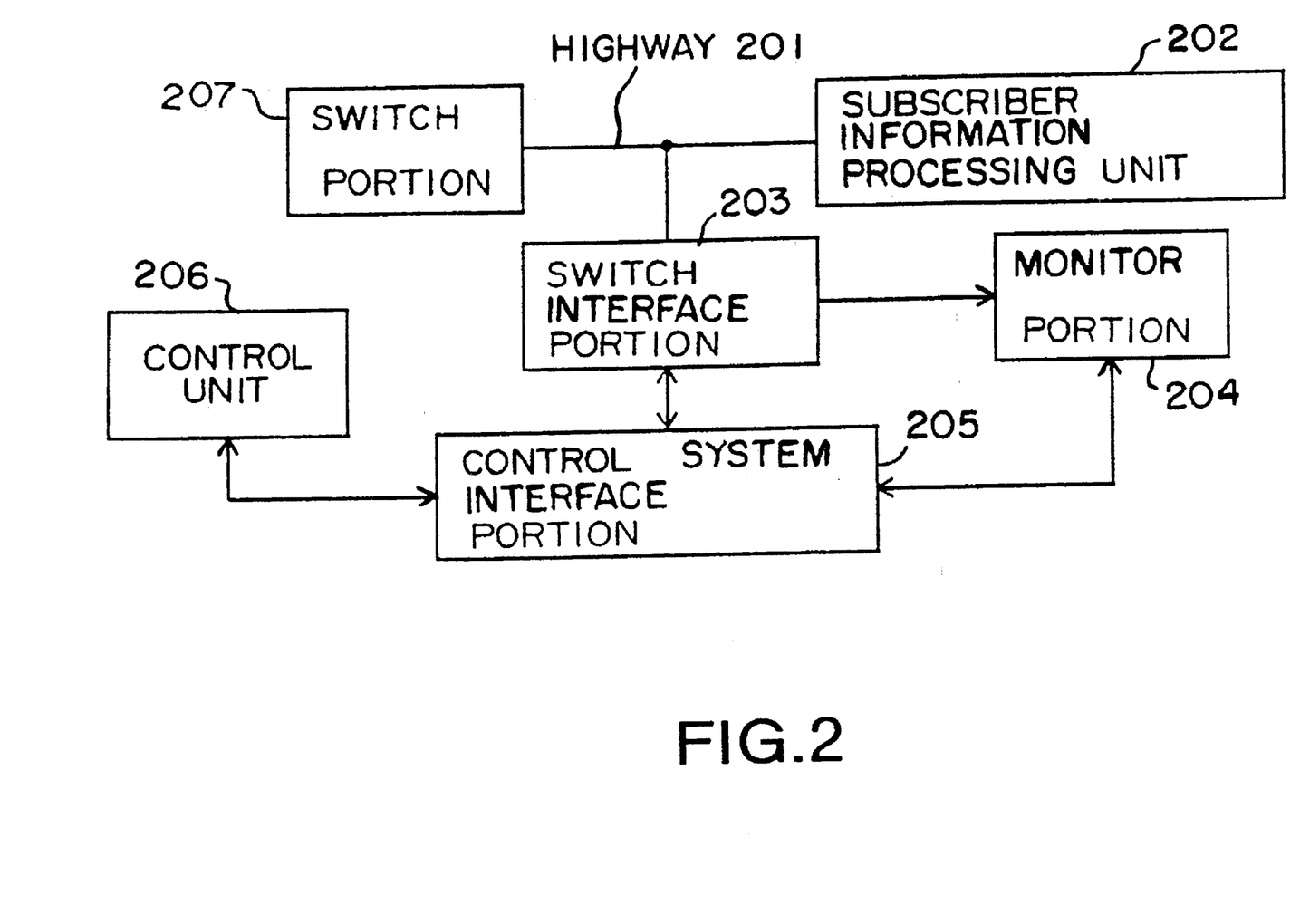
FIG. 2 is a block diagram (1) showing the principle of the present invention.

FIG. 2 is the block diagram showing the principle of the first aspect of the present invention.

The configuration according to the first aspect of the present invention is designed as being provided in a station which processes connectionless data (SMDS).

A switch interface portion 203 is connected as an optional external unit to a highway 201 connecting a subscriber information processing unit 202 for processing subscriber information to, for example, a switch portion 207. The switch interface portion 203 selectively receives a cell assigned a predetermined source address or destination address from among cells inputted via the highway 201.

A monitor portion 204 monitors predetermined subscriber information (a special study process) based on the cell inputted through the switch interface portion 203 according to a predetermined instruction. In the monitoring process, the number of cells are counted and illegal cells are logged.

With the configuration according to the first aspect, the present invention further comprises a control system interface portion 205 for communicating control information between a control unit 206 for controlling a monitoring process and the switch interface portion 203 or the monitor portion 204. The control information can be, for example, a source address or a destination address DA provided for the switch interface portion 203 by the control unit 206, a monitor instruction issued from the control unit 206 to the monitor portion 204, or monitor results read from the monitor portion 204 to the control unit 206.

According to the first aspect of the present invention, the switch interface portion 203, the monitor portion 204, and the control system interface portion 205 are connected as optional external units to the highway 201 to which the subscriber information processing unit 202 for processing subscriber information is connected.

With the above described configuration, the switch interface portion 203, the monitor portion 204, and the control system interface portion 205 have to monitor only a specified source address or a specified destination address predetermined in the switch interface portion 203. Therefore, the configuration according to the first aspect of the present invention can be simplified.

Also with the above described configuration, the increase in costs required in the subscriber information processing unit 202 can be prevented.

In this case, since the switch interface portion 203 only monitors subscriber information in the highway 201, the subscriber information processing unit 202 has no influence on the number of subscribers involved.

Figure 3:
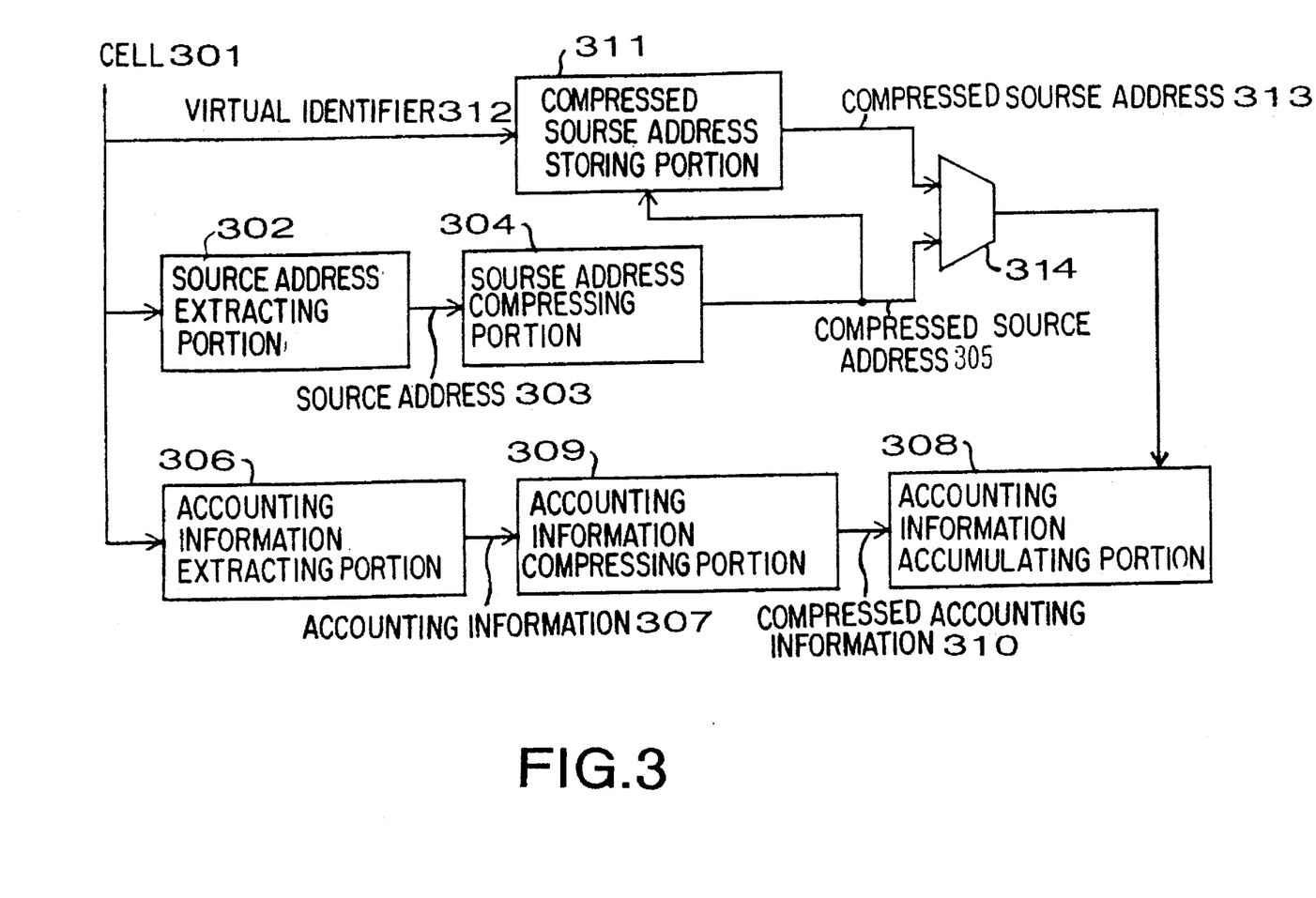
FIG. 3 is a block diagram (2) showing the principle of the present invention.

Next, FIG. 3 is the block diagram showing the principle according to the second aspect of the present invention.

The configuration of the second aspect of the present invention is provided in a station which processes connectionless data.

A source address extracting portion 302 extracts a source address 303 from a cell 301 received as being addressed to a subscriber accommodated in the station accommodating the source address extracting portion 302.

A source address compressing portion 304 compresses the source address 303 extracted by the source address extracting portion 302, and outputs a compressed source address 305. The source address compressing portion 304 has, for example, the following configuration. First, it comprises a predetermined number of source address storing portions. Next, it comprises a source address comparing portion for comparing the source address 303 extracted by the source address extracting portion 302 with the source address stored in each of the source address storing portions. Then, the source address compressing portion 304 comprises a comparison result determination control portion for outputting as a compressed source address 305 the identification information on the source address storing portion in which coincidence has been detected if the coincidence is detected by the source address comparing portion, and for writing the source address 303 extracted by the source address extracting portion 302 to the source address storing portion in which no source addresses have been stored and outputting as the compressed source address 305 the identification information on the source address storing portion which has written the address if coincidence is not detected by the source address comparing portion.

An accounting information extracting portion 306 extracts predetermined subscriber information as accounting information 307 from the received cell 301.

An accounting information accumulating portion 308 accumulates the accounting information 307 extracted by the accounting information extracting portion 306 at an address corresponding to the compressed source address 305 outputted by the source address compressing portion 304.

According to the second aspect, the present invention can further comprise an accounting information compressing portion 309 for compressing the accounting information 307 extracted by the accounting information extracting portion 306 and outputting compressed accounting information 310. In this case, the accounting information accumulating portion 308 accumulates the compressed accounting information 310 instead of the accounting information 307.

Furthermore, according to the second aspect, the present invention can further comprise a compressed source address storing portion 311 for storing a valid compressed source address 305 outputted by the source address compressing portion 304 at an address corresponding to a virtual identifier 312 of the received cell 301. If the source address compressing portion 304 outputs the valid compressed source address 305 through, for example, a selector 314, the accounting information accumulating portion 308 accumulates the accounting information 307 or the compressed accounting information 310 at an address corresponding to the compressed source address 305 outputted by the source address compressing portion 304. If the source address compressing portion 304 does not output the valid compressed source address 305 through, for example, a selector 314, the accounting information accumulating portion 308 accumulates the accounting information 307 or the compressed accounting information 310 at an address corresponding to the compressed source address 313 read from an address corresponding to the virtual identifier 312 of the received cell 301 in the compressed source address storing portion 311.

Next, according to the second aspect of the present invention, the accounting information 307 or the compressed accounting information 310 equal to the number of variations corresponding to the compressed source addresses 305, not equal to the number of variations corresponding to the source addresses 303, should be accumulated in the accounting information accumulating portion 308. As a result, the accounting information accumulating portion 308, etc. can be easily realized using normal circuit elements.

The scale or the circuit of the accounting information accumulating portion 308 can be furthermore reduced by having the accounting information storage portion 308 accumulate not the accounting information 307 but the compressed accounting information 310.

Furthermore, since the valid compressed source address 305 corresponding to the virtual identifier 312 is stored in the compressed source address storing portion 311, the compressed source address 313 corresponding to the cell 301 can be immediately extracted by referring to the compressed source address storing portion 311 using the virtual identifier 312 of each of the received cells 301 even if communications data of a subscriber are messages transmitted through a plurality of cells 301 and the plurality of cells 301 corresponding to one message are not received consecutively.

First Embodiment

The first embodiment of the present invention is described below. The first embodiment relates to a technology of monitoring subscriber information in processing a special study process.

Figure 4:
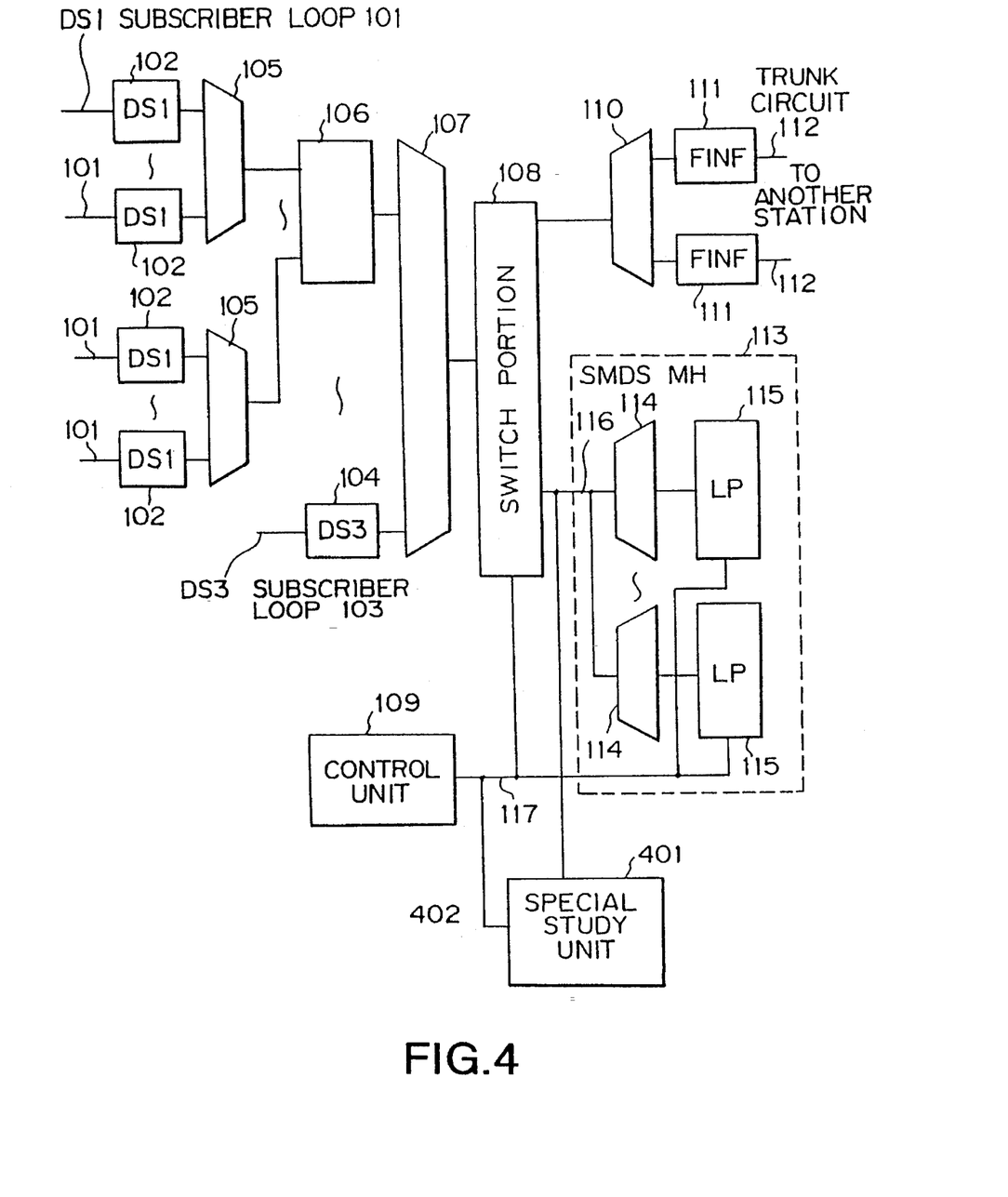
FIG. 4 shows the general configuration of the first preferred embodiment of the present invention.

FIG. 4 shows the general configuration of the first embodiment.

In FIGS. 1 and 4, units assigned the same number have the same function.

The configuration shown in FIG. 4 is different from that shown in FIG. 1 only in that a special study unit 401 is connected as an optional external unit to the highway 116 for connecting the switch unit 108 with the SMDS-MH 113.

Since the'subscriber information accommodated in the SMDS-MH 113 is multiplexed in the highway 116, the special study unit 401 is connected to the highway 116 by the method used for the SMDS-MH 113. The special study unit 401 is also connected to the control unit 109 through a control system interface unit 502 described later (shown in FIG. 5).

As shown in FIG. 4, a cost for the operation of the SMDS-MH 113 can be prevented from increasing by mounting the special study unit 401 as an optional external unit.

Figure 5:
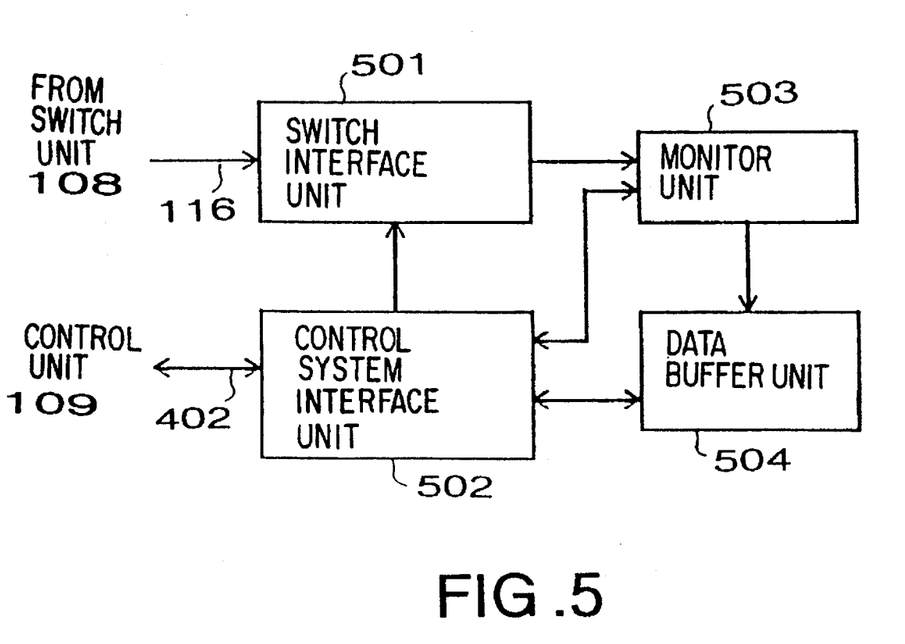
FIG. 5 shows the configuration of the special study unit according to the first preferred embodiment of the present invention.

FIG. 5 shows the configuration of the special study unit 401 shown in FIG. 4.

First, the special study unit 401 is connected to the control unit 109 shown in FIG. 4 through the control system interface unit 502 and a control line 402. The control system interface unit 502 controls the transmission of data according to an interface referred to as a DMA (direct memory access)-based PIF (processor interface), between a switch interface unit 501 and the control unit 109, a data buffer unit 504 and the control unit 109, or a monitor unit 503 and the control unit 109.

If a command is issued by the control unit 109 to perform a special study process, a source address SA or a destination address DA to be processed in the special study is set, according to the contents of the command, in the switch interface unit 501 through the control system interface unit 502. The start time, process time, a target of a process (cell or message), etc. of a special study are set in the switch interface unit 501 through the control system interface unit 502.

The switch interface unit 501 is connected, as being disconnectable, to the highway 116 (shown in FIG. 4) using a connector. The switch interface unit 501 exclusively receives cells, from among those inputted from switch unit 108 (shown in FIG. 4) through the highway 116, containing a message having a source address SA or a destination address DA assigned by the control unit 109 (shown in FIG. 4) or receives only messages, and applies the cells to the monitor unit 503. In this case, the switch interface unit 501 performs the above described process on a predetermined cell or message from a predetermined time for a predetermined process time.

The monitor unit 503 starts monitoring the cells or messages inputted by the switch interface unit 501 according to a monitor start instruction issued from the control system interface unit 502 in accordance with the contents defined by the control unit 109 (FIG. 4) and received together with the above described monitor start instruction. Practically, if the contents describe a counting of the number of cells or messages, then the monitor unit 503 notifies the data buffer unit 504 of the reception of a cell or a message when the cell has been received. For example, if the contents describe a counting of the length of a message, then the monitor unit 503 counts the length of the received message and notifies the data buffer unit 504 of the count result. For example, if the contents describe a logging of an illegal cell or message, then the monitor unit 503 extracts an illegal cell or message by checking the contents of the cells or messages inputted by the switch interface unit 501, and notifies the data buffer unit 504 of the extracted contents.

The data buffer unit 504 performs the following operation in accordance with the contents determined by the control unit 109 (shown in FIG. 4). That is, if the contents describe a counting of the number of cells or messages, then the data buffer unit 504 resets a counter area in which the number of the cells or messages are counted according to the count start instruction issued from the control system interface unit 502, increments a value in the counter area each time it receives a notification from the monitor unit 503, and stops incrementing the value of the counter area if a count stop instruction is issued from the control system interface unit 502. If either of a specific source address SA or a destination address DA is set in the switch interface unit 501, and the number of cells or messages corresponding to the address is counted, then the count result indicates the number of cells or messages sent by a specific source subscriber or received by a specific destination subscriber. If both a specific source address SA and a destination address DA are set in the switch interface unit 501, and the number of cells or messages corresponding to the source address SA and destination address DA is counted, then the count result indicates the number of cells or messages at the point-to-point traffic between the specific source subscriber and the destination subscriber. For example, if contents of the monitoring operation refers to a counting of the length of a message, then the data buffer unit 504 calculates a sum of message lengths notified by the monitor unit 503 for each classification category predetermined by the control unit 109. On the other hand, if the contents describe a logging of an illegal cell, then the data buffer unit 504 records as a log the extracted contents when an illegal cell is extracted. The extracted contents indicates that detected are, for example, an invalid source address SA, an unreachable destination address DA, a preliminarily prohibited source address SA or destination address DA, etc. The value in the above described counter area is, or the contents of the log are, read to the control unit 109 by a command from the control unit 109 (FIG. 4).

As described above, if the special study unit 401 shown in FIG. 4 is connected as an optional external unit to the highway 116, then it only has to monitor a source address SA or a destination address DA specified by the control unit 109 shown in FIG. 4. Thus, the configuration of the special study unit 401 can be simplified.

Furthermore, since the special study unit 401 is an optional external unit, a cost for operating the SMDS-MH 113 can be prevented from undesirably increasing.

The special study unit 401 only monitors subscriber information in the highway 116. Therefore, there are no restrictions on the number of message shelves (MESH) each being composed of the interface 114 and the line processor (LP) 115 accommodated in the SMDS-MH 113.

Second Embodiment

The second embodiment is explained below. The second embodiment relates to a technology of collecting subscriber information in an accounting process. The general configuration of the second embodiment is the same as the typical configuration of the SMDS shown in FIG. 1.

Before explaining the detailed configuration for the second embodiment, described is an accounting parameter indicating subscriber information required in the accounting process in the SMDS.

The accounting parameter can be a destination address DA, source address SA, group address, carrier information, condition code, segment count, or packet count. In the second embodiment explained below, in the LP 115 (shown in FIG. 1) in the SMDS-MH 113 provided in each station, a destination address DA, group address, carrier information, condition code, segment count, and packet count are stored for a source address SA for which communications are established.

A source address SA is an address of a source subscriber who sends a message for a destination address DA processed by each LP 115. The address is contained in a source address field (SA field) in a header portion of a message to be transmitted and transmitted.

A destination address DA is an address of a destination subscriber processed by the LP 115. The address can be a discrete address, which is a normal destination subscriber address, or a group address. The group address is defined to realize a broadcast communication. One group address is defined for a plurality of discrete addresses, and a message is sent with the group address as a destination address DA so that it can be simultaneously sent to subscribers having the addresses defined corresponding to the group address. The discrete addresses and the group address are contained in a destination address field (DA field) in a header portion in the transmitted message and transmitted. An address in a destination address field can be determined through a flag set in the field whether it is a discrete address or a group address.

Carrier information describes a type of transmission line. The information is cited in a network which provides a toll call referred to as, for example, LATA interconnections if a plurality of transmission lines exist through a plurality of vendors, and if each of the plurality of vendors has a different accounting system. In this case, when the SMDH MH 113 (shown in FIG. 1) of each station receives a message, it transmits the message put in a plurality of cells to a gateway message handler after assigning to the message a header for the interconnection between stations unless the message is addressed to the present station. The gateway message handler determines a station having a corresponding area code by determining the area code of a higher order address area in the destination address DA of the message and transmits the message to the station. If the message is transmitted through transmission lines of a plurality of vendors, the message is transmitted through each of the transmission lines of the vendors. If the SMDS-MH 113 receives a message from a transmission line of another vendor (the trunk circuit 112 shown in FIG. 1), it assigns to a header area for the interconnection of the received message between stations carrier information indicating the identity of the vendor of the transmission line through which the message is transmitted. The assigned carrier information is referred to in an accounting process.

A condition code indicates the presence or absence of a transmission error of a cell transmitted through a plurality of cells, and of a transmission error of a message transmitted through a plurality of cells. The code is detected in an accounting process described later.

Figure 6:
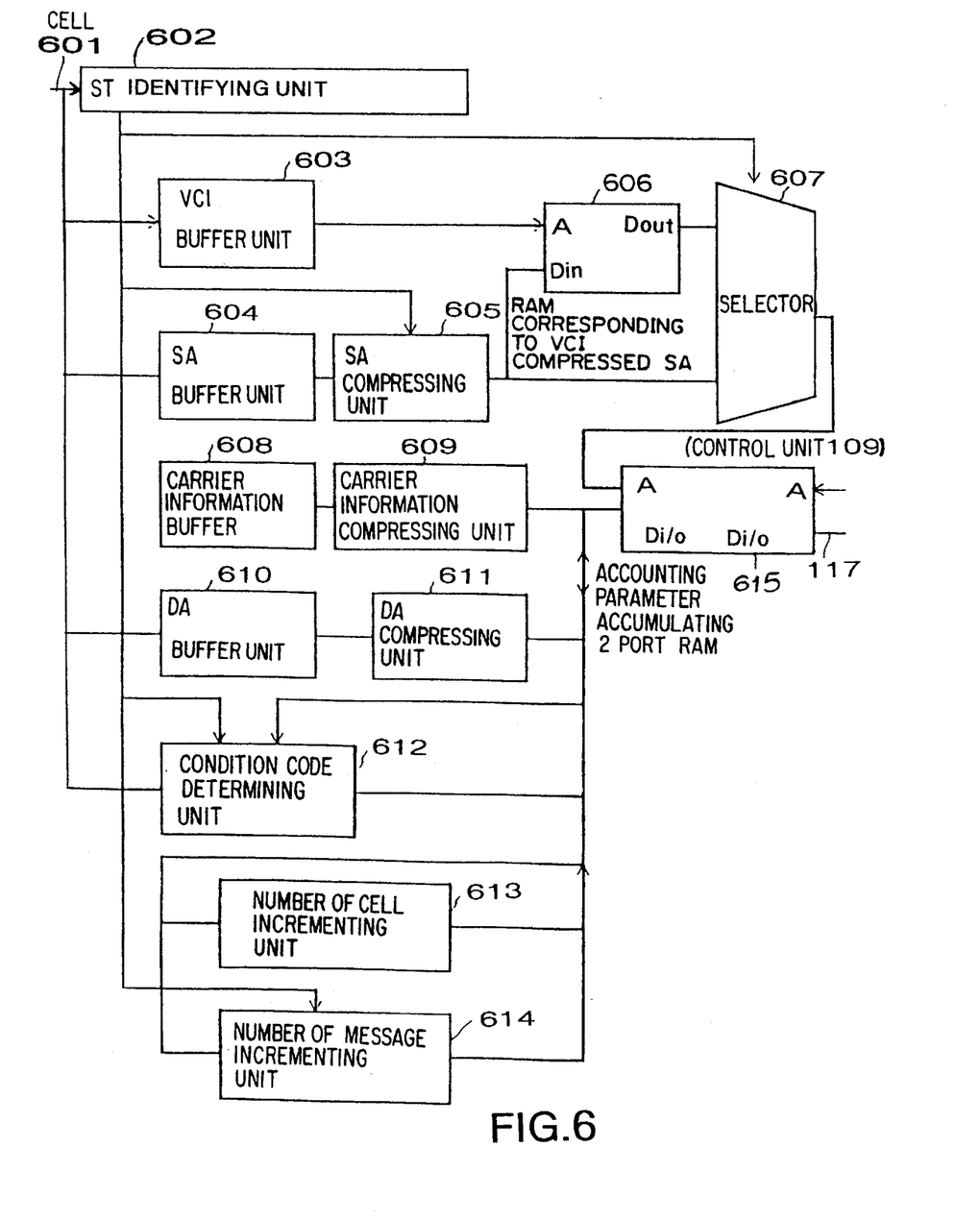
FIG. 6 shows the configuration of the accounting unit according to the second preferred embodiment of the present invention.

FIG. 6 shows the configuration of the accounting unit for processing the above described accounting parameters. The configuration is realized in the LP 115 (shown in FIG. 1) in the SMDS-MH 113 provided in each station.

Figures 8A, 8B, 8C, 8D, 8E, 8F, 8G, 8H:
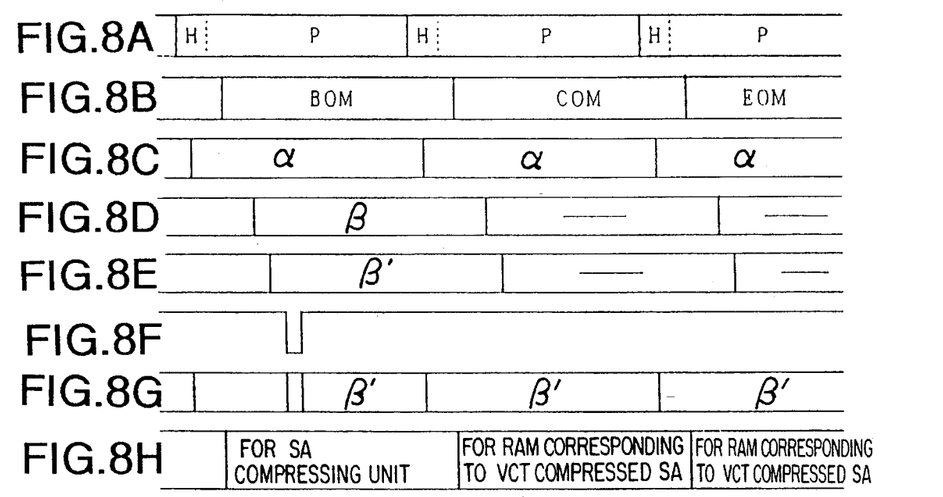
Figures 8I, 8J, 8K, 8L, 8M, 8N:
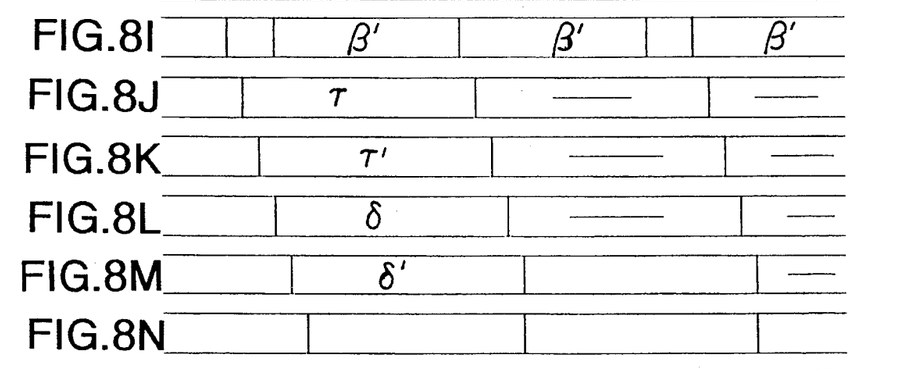
Figures 8O, 8P, 8Q, 8R:
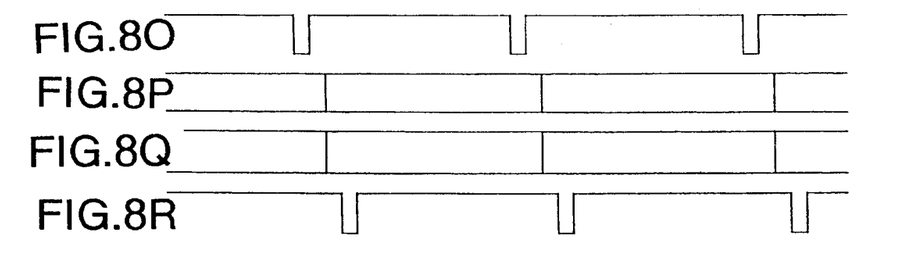

A cell 601 is applied from the switch unit 108 shown in FIG. 1 through the highway 116, and comprises a header portion and a payload portion. FIG. 8 is the timing chart of the accounting unit shown in FIG. 6. Part (a) of FIG. 8 shows the input timing of three cells, each comprising a header portion H and a payload portion P.

A message is transmitted in a plurality of cells. At this time, a cell containing the heading part of the message is referred to as a BOM (beginning of message); a cell containing the tailing part of the message is referred to as an EOM (end of message); and a cell containing the other portion than the heading and tailing portions is referred to as a COM (continuation of message). An attribute of each cell, that is, a BOM, COM, or EOM, can be identified by a segment type ST stored in the payload portion of each cell.

In an accounting process, cells having each of the above described attributes are identified by an ST identifying unit 602 for the purpose of determining the contents of the message. That is, the ST identifying unit 602 determines the attribute of the present cell 601 as a BOM, COM, or EOM by extracting the segment type ST which is contained payload o the sell 601 currently inputted, and notifies SA compressing unit 605, selector 607, condition code determining unit 612, and number-of-message incrementing unit 514 of a determination result. In the example shown in the timing chart in part (b) of FIG. 8, the three cells 601 inputted at the timing shown in part (a) of FIG. 8 are BOM, COM, an EOM as being identified by the ST identifying unit 602. A plurality of cells 601 for storing a single message are not necessarily inputted in series.

A plurality of cells 601 for storing a single message are controlled to have the same VCI. A VCI is contained in the header portion of the cell 601 and held in a VCI buffer unit 603 at a timing shown in part (c) of FIG. 8. The timing chart shown in FIG. 8 shows three cells 601 having the same VCI a for the attributes of BOM, COM, and EOM.

A source address SA is contained in the header portion of a message transmitted in the payload portions P (part (a) of FIG. 8) of a plurality of cells 601, and occupies 64 bits. The header portion of the message is stored in the cell 601 having the attribute of a BOM. An SA buffer unit 604 holds a part of data of the payload P as a source address SA. Therefore, as shown in part (d) of FIG. 8, the SA buffer unit 604 holds a correct source address SA ($=\beta$) contained in the header portion of the message at a timing of entering the cell 601 having the attribute of a BOM.

The SA compressing unit 605 compresses a 64-bit source address SA held in the SA buffer unit 604 at the timing at which the ST identifying unit 602 detects the cell 601 having the attribute of a BOM.

The LP 115 (shown in FIG. 1) provided with the accounting unit shown in FIG. 6 can process subscriber information in up to 32 DS1 subscriber loops 101 accommodated in its station. Therefore, the number of source addresses SA stored by a single LP 115 is equal to the number of source subscribers who transmitted a message to any destination addresses DA corresponding to the subscriber accommodated in up to 32 DS1 subscriber loops 101. The number of source subscribers who transmit messages to such amount of destination addresses DA can be assumed to be approximately $2^{10}=1024$. Based on the assumption, the SA compressing unit 605 can be realized by the configuration shown in FIG. 7.

Figure 7:
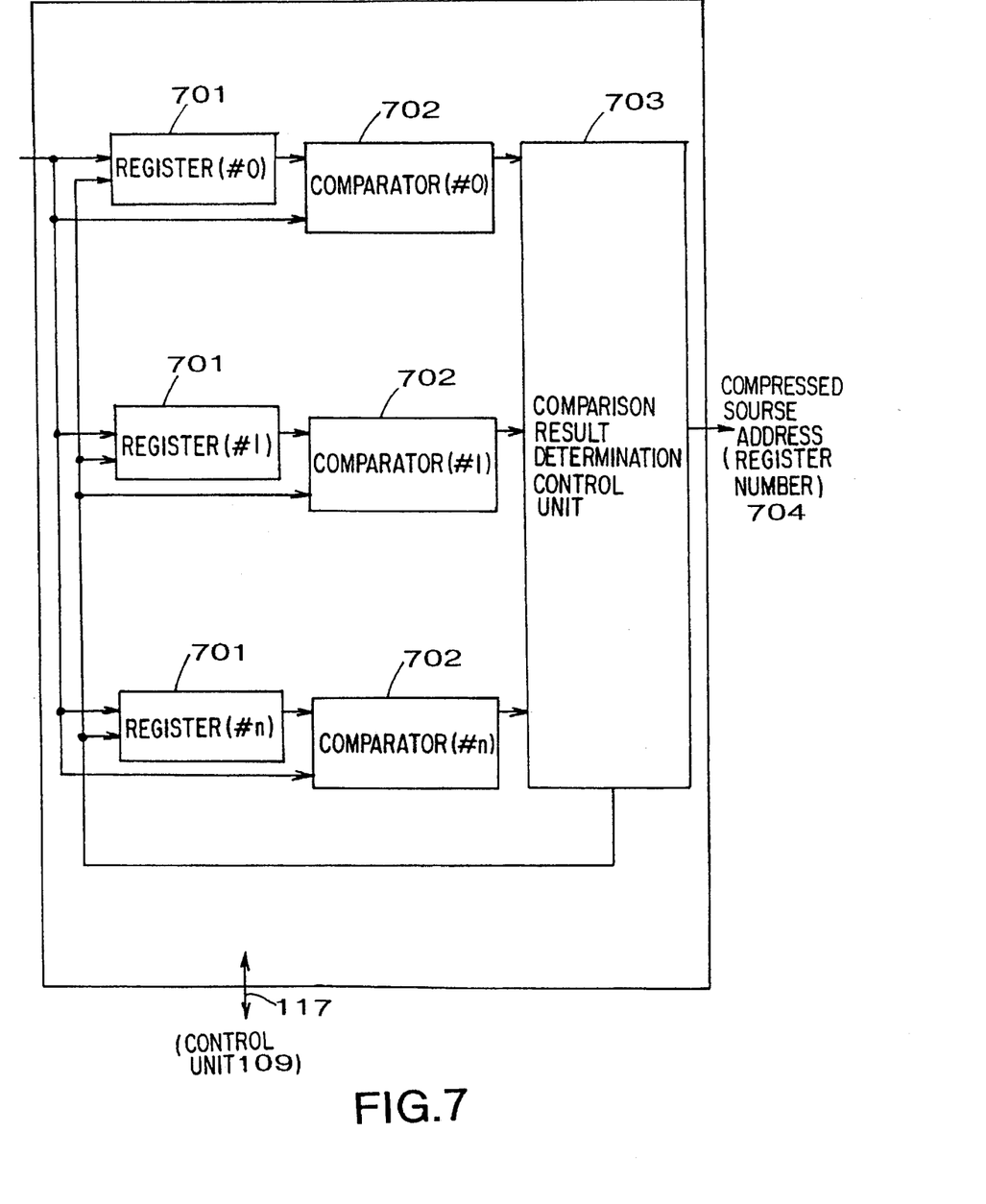
FIG. 7 shows the configuration of the compressing circuit according to the second preferred embodiment of the present invention.

In FIG. 7, each time a single LP 115 receives a message addressed with a new source address SA, the source address SA is held in any registers 701 #0 through #n (for example, n=1024) sequentially. An output of registers 701 #0 through #n and an output of SA buffer unit 604 shown in FIG. 6 are compared with each other by comparators 702 #0 through #n. If any of the registers 701 (#0 through #n) is detected as coincident by a comparison result determination control unit 703, then the number of the coincident register is outputted as a compressed source address 704. Now, a 64-bit source address SA has been successfully compressed into an approximately 10-bit compressed source address 704.

A practical process performed with the configuration shown in FIG. 7 is described below.

First, the firmware executed by the control unit 109 shown in FIG. 1 sets all registers 701 #0 through #n in the SA compressing unit 605 of the accounting unit (shown in FIG. 6) provided in the LP 115 to 0 in all bits through control line 117. The comparison result determination control unit 703 sets 0 as the number of an available register.

With the settings, since all bits of a first entered source address SA are not set to 0, the address does not match in the comparison performed by any of comparators 702 #0 through #n. When the comparison result determination control unit 703 determines that none of comparators 702 #0 through #n output a matching result, it provides the inputted source address SA for register 701 #0 corresponding to the number of an available register. Simultaneously, the comparison result determination control unit 703 outputs the register number=0 as the compressed source address 704. Furthermore, the comparison result determination control unit 703 increments the number of an available register to 1 from 0.

When the same address as the source address SA held in register 701 #0 is entered, none of comparators 702 #0 through #n determine a matching result. Then, if the comparison result determination control unit 703 determines again that none of comparators 702 #0 through #n determine a matching result, then it assigns the inputted source address SA to register 701 #1 corresponding to the number of an available register. Simultaneously, the comparison result determination control unit 703 outputs the register number=1 as the compressed source address 704. Furthermore, the comparison result determination control unit 703 increments the number of an available register to 2 from 1.

As described above, new source addresses SA are sequentially held in any of the registers 701.

The comparison result determination control unit 703 assigns a source address SA to the register 701 at a timing at which the ST identifying unit 602 detects the cell 601 having the attribute of the BOM, that is, at a timing at which the SA buffer unit 604 holds a correct source address SA.

Then, if the same address as the source address SA held in register 701 #0 is entered, comparator 702 #0 outputs a matching result. As a result, the comparison result determination control unit 703 outputs the register number=0 as the compressed source address 704. Thus, the source address SA is compressed.

If all registers 701 #0 through #n are being used, the memory of the control unit 109 can be designed such that it could be used instead of the register 701. With such configuration, it can be designed such that a source address SA held in the register 701 can be replaced with the source address SA held in the memory of the control unit 109 depending on the communication frequency.

The compressed source address 704 ($=\beta'$) outputted from the SA compressing unit 605 shown in FIG. 6 at the timing shown in part (e) of FIG. 8 is written to a VCI/compressed SA RAM 606 (Din) at the timing shown in part (f) of FIG. 8. As for an address (A), the VCI of the cell 601 in which a source address SA corresponding to the compressed source address 704 has been stored, and the one held in the VCI buffer unit 603 is used. Part (g) of FIG. 8 shows an output of the VCI/compressed SA RAM 606 (Dout).

That is, only at the timing of entering the cell 601 having the attribute of a BOM, the VCI/compressed SA RAM 606 writes as an address corresponding to the VCI of the 601 the compressed source address 704 corresponding to the source address SA of the message stored in the payload portion of the cell 601. At other timings, it outputs the compressed source address 704 corresponding a VCI from the address corresponding to the VCI of the currently entered cell 601.

An output of the VCI/compressed SA RAM 606 and an output of the SA compressing unit 605 are applied to the selector 607. The selector 607 passes the output of the SA compressing unit 605 at the timing at which the ST identifying unit 602 detects the cell 601 having the attribute of a BOM as shown in parts (h) and (i) of FIG. 8, and passes the output of the VCI/compressed SA RAM 606 at the timing at which the ST identifying unit 602 detects the cell 601 having an attribute other than a BOM. A compressed source address outputted by the selector 607 is applied as an address (A) to an accounting parameter accumulating 2-port RAM 615.

As a result, the accounting parameter accumulating 2-port RAM 615 accumulates other accounting parameters (described later) separately by compressed source address. In this case, the number of bits occupied by a compressed source address is approximately 10 bits as described above. Accordingly, the accounting parameter accumulating 2-port RAM 515 can be realized using a normal LSI chip. The VCI/compressed SA RAM 606 outputs a right compressed source address corresponding to the VCI of the present cell 601 at an input timing other than that of the cell 601 having the attribute of a BOM. Accordingly, the accounting parameter accumulating 2-port RAM 615 can constantly collect accounting parameters corresponding to right compressed source addresses of the VCI of the present cell 601.

Next, a carrier information and destination address DA are contained in the header portion of a message transmitted in payload portions P of a plurality of cells 601 (part (a) of FIG. 8) as in the case of the source address SA. The header portion of a message is contained in the cell 601 having the attribute of a BOM. A carrier information buffer unit 608 and a DA buffer unit 510 hold a part of data of payload portions P as carrier information and a destination address DA each time the cell 601 is entered as in the case of the SA buffer unit 604. Accordingly, as shown in parts (l) and (j) of FIG. 8, the carrier information buffer unit 608 and the DA buffer unit 510 hold correct carrier information (=δ) and destination address DA (=Γ) stored in the header portion of the message only at the timing of entering the cell 601 having the attribute of a BOM.

A carrier information compressing unit 609 and a DA compressing unit 611 compresses carrier information and a destination address DA held by the carrier information buffer unit 608 and the DA buffer unit 610 respectively. The configuration of these units is the same as that of the SA compressing unit 605 shown in FIG. 7.

At present, a destination address DA contains 64-bit data. As described above, a single LP 115 processes subscriber information in up to 32 DS1 subscriber loops 101 accommodated in the station which contains the LP 115. In a single DS1 subscriber loop, as destination addresses DA up to 64 addresses can be defined as containing up to 16 individual addresses and up to 48 group addresses (described later). Thus, the maximum number of destination addresses DA a single LP 115 can process is 64×32=2048. Accordingly, entering the patterns of destination addresses DA processed by LP 115 in registers 701 #0 through #n=#2048 shown in FIG. 7 enables a 64-bit destination address DA to be compressed to an approximately 11-bit destination address.

On the other hand, since there are not so many variations on carrier information, carrier information is compressed by a preliminary entry of patterns of carrier information in the registers 701 the number of which depends on the variations.

With the configuration shown in FIG. 7 for realizing the carrier information compressing unit 609 or the DA compressing unit 611 the register 701 preliminarily accepts patterns. Therefore, it is not necessary for the comparison result determination control unit 703 to have the register 701 autonomously receive data. Control information is not-required from the ST identifying unit 602, either.

As described above, the compressed carrier information (=δ') and the compressed address (=Γ') are outputted from the carrier information compressing unit 609 and the DA compressing unit 511 respectively at the timing shown in parts (m) and (k) of FIG. 8, and are written to the first memory chip forming part of the accounting parameter accumulating 2-port RAM 615. In this case, the address (A) is, as described above, the compressed source address (=β' (shown in part (i) of FIG. 8) corresponding to the VCI of the cell 601 being entered from the selector 607. The writing operation is performed only at the timing, among the timings shown in part (r) of FIG. 8, of entering the cell 601 having the attribute of a BOM.

The condition code determining unit 512 determines the existence of a transmission error of the cell 601 and of a message transmitted in a plurality of cells 601. The determination is made by checking, for example, a check bit added to the cell 601 and a check bit added to a message. A number-of-cell incrementing unit 613 counts the number of cells 601 each time the cell 601 is received. The number-of-message incrementing unit 614 counts the number of messages each time a message in a plurality of cells is received.

The condition code outputted by the condition code determining unit 612, the number of cells outputted by the number-of-cell incrementing unit 613, and the number of messages outputted by the number-of-message incrementing unit 614 are written to the second memory chip forming part of the accounting parameter accumulating 2-port RAM 615. In this case, the address (A) is the compressed source address (=β' (shown in part (i) of FIG. 8) corresponding to the VCI of the cell 601 being entered from the selector 607.

For a message, the condition code determining unit 612 must determine the existence of a transmission error of the cell 601 and of a message transmitted in a plurality of cells 601 at each timing of entering each of the plurality of cells 601 containing the message. Therefore, the condition code determining unit 612 needs all condition codes from the start of the entering of messages. Then, the condition code determining unit 612 reads all condition codes from the second memory chip forming part of the accounting parameter accumulating 2-port RAM 615 at each timing shown in part (o) of FIG. 8 so as to determine the existence of errors. In this case, the address (A) is the compressed source address (=β' (shown in part (i) of FIG. 8)) corresponding to the VCI of the cell 601 being entered from the selector 607. As a result, the condition code determining unit 612 sequentially outputs condition codes as shown in part (n) of FIG. 8 synchronously with the input timing of the cell 601.

The number-of-cell incrementing unit 613 needs the number of cells entered up to the present to sequentially increment the number of cells. Then, the number-of-cell incrementing unit 613 reads the number of cells entered up to the present from the second memory chip forming part of the accounting parameter accumulating 2-port RAM 615 at each timing shown in part (o) of FIG. 8, and increments the number of cells. In this case, the address (A) is the compressed source address (=β' (shown in part (i) of FIG. 8) corresponding to the VCI of the cell 601 being entered from the selector 607. As a result, the number-of-cell incrementing unit 613 sequentially outputs the number of cells as shown in part (p) of FIG. 8 synchronously with the input timing of the cell 601.

Furthermore, the number-of-message incrementing unit 614 needs the present number of message to sequentially increment the number of messages. The number-of-message incrementing unit 614 reads the present number of messages from the second memory chip forming part of the accounting parameter accumulating 2-port RAM 615 only at the timing of entering the cell 601 having the attribute of an EOM among the timings shown in part (o) of FIG. 8, and increments the number of messages. In this case, the address (A) is the compressed source address (=β' (shown in part (i) of FIG. 8) corresponding to the VCI of the cell 601 being entered from the selector 607. As a result, the number-of-message incrementing unit 614 outputs the number of cells synchronously with the timing of entering the cell 601 having the attribute of EOF indicating the end of a message as shown in part (q) of FIG. 8. In part (q) of FIG. 8, the timing shown as being shaded is the portion not processed in the incrementing process.

The firmware of the control unit 109 preliminarily sets to zero for each of the addresses of the first and second memory chips forming the accounting parameter accumulating 2-port RAM 615.

Thus, the first and second memory chips forming the accounting parameter accumulating 2-port RAM 615 accumulate compressed carrier information, compressed destination addresses, condition codes, the number of cells, and the number of messages for each address corresponding to a compressed source address.

On the other hand, the firmware executed by the control unit 109 (shown in FIG. 1) periodically reads for each compressed source address an accounting parameter from the accounting parameter accumulating 2-port RAM 615 through the control line 117 connected to the LP 115, and generates accounting data.

Practically, the firmware reads a source address SA autonomously held in register 701 #0 (shown in FIG. 7) in the SA compressing unit 605 (shown in FIG. 6). Next, it reads compressed carrier information and a compressed destination address from compressed source address=0 (corresponding to register 701 #0) in the first memory chip forming part of the accounting parameter accumulating 2-port RAM 615. Then, the firmware reads the carrier information corresponding to the compressed carrier information from the register 701 (shown in FIG. 7), in the carrier information compressing unit 609 (FIG. 6), having the number corresponding to the compressed carrier information. Then, the firmware reads a destination address DA corresponding to the compressed destination address from the register 701 (shown in FIG. 7), in the DA compressing unit 511 (shown in FIG. 6), having the number corresponding to the compressed destination address. Then, it reads a condition code, the number of cells, and the number of messages from compressed source address=0 (corresponding to register 701 #0) in the second memory chip forming part of the accounting parameter accumulating 2-port RAM 615.

Thus, the firmware extracts carrier information, a destination address DA, a condition code, the number of cells, and the number of messages as accounting data corresponding to a source address SA.

Likewise, the firmware extracts accounting data from the contents of registers 701 #1 and the followings (shown in FIG. 7) in the SA compressing unit 605 (shown in FIG. 6) if the register 701 holds a source address SA. If the contents of the register 701 are 0, then registers 701 having the numbers including and after the number of the present register 701 have no autonomously registered source addresses SA, and the firmware terminates the extracting process of accounting data.

In the above described second embodiment, it can be designed that the cell 601 applied to the accounting device shown in FIG. 6 can be applied only when it has passed a screening process. A screening process is performed by the LP 115 such that it performs acceptance or reception of a message having a predetermined source address SA from among messages addressed to its destination address DA. To realize the function, the LP 115 contains a screening table. If a source address SA stored in the message received by the LP 115 is entered in the table corresponding to the destination address DA stored in the message, then the message can be accepted or rejected. In this case, a subscriber can select through the LP 115 whether a message is accepted or rejected.

Thus, the cells 601 accepted only by the screening process can be applied to the accounting unit, and messages to be transmitted to the subscriber can be limited based on the subscriber.

In the above described second embodiment, the number (n) of registers 701 for holding source addresses SA in the SA compressing unit 605 shown in FIG. 6 is approximately 1024. However, the present invention is not limited to this number. Even if the number of registers 701 increases up to approximately 216 the accounting unit shown in FIG. 6 can be generated with normal circuit elements.

The SA compressing unit 605, the carrier information compressing unit 609, and the DA compressing unit 611 are designed by mainly using a plurality of registers 701 as shown in FIG. 7. However, a memory can replace the plurality of registers 701.

Furthermore, the accounting parameter accumulating 2-port RAM 615 is not necessarily composed of two memory chips.

What is claimed is:

1. A subscriber information processing system in a connectionless data service, comprising:

a connectionless data processing station connected to a highway;

switch interface means, provided to said connectionless data processing station and disconnectably-connected thereto as an external unit via said highway;

a subscriber information processing unit for processing subscriber information connected to said highway, said switch interface means being controlled to enter cells corresponding to predetermined source addresses or predetermined destination addresses from among cells entered by the highway;

monitor means, provided to the connectionless data processing station and being coupled to said switch interface means, for monitoring predetermined subscriber information in the cells entered by said switch interface means according to a predetermined instruction;

a control unit; and control system interface means, provided to the connectionless data processing station and being coupled between said control unit and said monitor means and said switch interface means, for communicating control information between said control unit and said monitor means and said switch interface means to control said monitor means and said switch interface means.

2. A subscriber information processing system in a connectionless data service, comprising:

a connectionless data processing station;

source address extracting means, provided to said connectionless data processing station, for extracting a source address from a cell received as being addressed to a subscriber accommodated in the connectionless data processing station;

source address compressing means, provided to the connectionless data processing station, for compressing the source address extracted by said source address extracting means and outputting a compressed source address;

accounting information extracting means, provided to the connectionless data processing station, for extracting a predetermined subscriber information as an accounting information from the received cell; and accounting information accumulating means, provided to the connectionless data processing station, for accumulating the accounting information extracted by said accounting information extracting means in an address corresponding to the compressed source address outputted by said source address compressing means.

3. The subscriber information processing system according to claim 2, wherein
said accounting information contains at least one of a destination address, carrier information, a condition code, information about a number of cells, and information about a number of messages.

4. The subscriber information processing system according to claim 2, wherein
said source address compressing means comprises:
a predetermined number of source address storing means,
source address comparing means for comparing the source address extracted by said source address extracting means with a source address stored in said number of source address storing means for determination of coincidence, and
comparison result determination control means for outputting identification information in said number of source address storing means indicating a coincidence as the compressed source address when said source address comparing means detects a coincidence, and for writing the source address extracted by said source address extracting means to a source address storing means of said number of source address means, which does not store the source address and simultaneously outputting identification information in said source address storing means to which the source address is written as the compressed source address when said source address comparing means detects no coincidence.

5. The subscriber information processing system according to claim 4, wherein
said accounting information contains at least one of a destination address, carrier information, a condition code, information about a number of cells, and information about a number of messages.

6. A subscriber information processing system in a connectionless data service, comprising:
a connectionless data processing station;
source address extracting means, provided to said connectionless data processing station, for extracting a source address from a cell received as being addressed to a subscriber accommodated in the connectionless data processing station;
source address compressing means, provided to the connectionless data processing station, for compressing the source address extracted by said source address extracting means and outputting a compressed source address;
accounting information extracting means, provided to the connectionless data processing station, for extracting a predetermined subscriber information as an accounting information from the received cell; and
accounting information compressing means, provided to the connectionless data processing station, for compressing the accounting information extracted by said accounting information extracting means and outputting compressed accounting information; and
accounting information accumulating means, provided to the connectionless data processing station, for accumulating the compressed accounting information outputted by said accounting information compressing means in an address corresponding to the compressed source address outputted by said source address compressing means.

7. The subscriber information processing system according to claim 6, wherein
said accounting information contains at least one of a destination address, carrier information, a condition code, information about a number of cells, and information about a number of messages.

8. The subscriber information processing system according to claim 6, wherein
said source address compressing means comprises:
a predetermined number of source address storing means,
source address comparing means for comparing the source address extracted by said source address extracting means with a source address stored in said number of source address storing means for determination of coincidence, and
comparison result determination control means for outputting identification information in said source address storing means indicating a coincidence as the compressed source address when said source address comparing means detects a coincidence, and for writing the source address extracted by said source address extracting means to a source address storing means of said number of source address storing means, which does not store the source address and simultaneously outputting identification information in said source address storing means to which the source address is written as the compressed source address when said source address comparing means detects no coincidence.

9. The subscriber information processing system according to claim 8, wherein
said accounting information contains at least one of a destination address, carrier information, a condition code, information about a number of cells, and information about a number of messages.

10. A subscriber information processing system in a connectionless data service, comprising:
a connectionless data processing station;
source address extracting means, provided to said connectionless data processing station, for extracting a source address from a cell received as being addressed to a subscriber accommodated in the connectionless data processing station;
source address compressing means, provided to the connectionless data processing station, for compressing the source address extracted by said source address extracting means and outputting a compressed source address;
compressed source address storing means, provided in the connectionless data processing station, for storing a valid compressed source address outputted by said source address compressing means in an address corresponding to a virtual identifier of the received cell;
accounting information extracting means, provided to the connectionless data processing station, for extracting a predetermined subscriber information as an accounting information from the received cell; and
accounting information accumulating means, provided in the connectionless data processing station, for accumulating the accounting information extracted by said accounting information extracting means in an address corresponding to the compressed source address outputted by said source address compressing means when said source address compressing means outputs a valid compressed source address, and for accumulating the accounting information extracted by said accounting information extracting means in an address corresponding to the compressed source address read from an address corresponding to the virtual identifier of the cell received by said compressed source address storing means when said source address compressing means does not output the valid compressed source address.

11. The subscriber information processing system according to claim 10, wherein said accounting information contains at least one of a destination address, carrier information, a condition code, information about a number of cells, and information about a number of messages.

12. The subscriber information processing system according to claim 10, wherein said source address compressing means comprises:
a predetermined number of source address storing means,
source address comparing means for comparing the source address extracted by said source address extracting means with a source address stored in said number of source address storing means for determination of coincidence, and
comparison result determination control means for outputting identification information in said number of source address storing means indicating a coincidence as the compressed source address when said source address comparing means detects a coincidence, and for writing the source address extracted by said source address extracting means to a source address storing means of said number of source address storing means, which does not store the source address and simultaneously outputting identification information in said source address storing means to which the source address is written as the compressed source address when said source address comparing means detects no coincidence.

13. The subscriber information processing system according to claim 12, wherein said accounting information contains at least one of a destination address, carrier information, a condition code, information about a number of cells, and information about a number of messages.

14. A subscriber information processing system in a connectionless data service, comprising:

a connectionless data processing station;
source address extracting means, provided to said connectionless data processing station, for extracting a source address from a cell received as being addressed to a subscriber accommodated in the connectionless data processing station;
source address compressing means, provided to the connectionless data processing station, for compressing the source address extracted by said source address extracting means and outputting a compressed source address;
compressed source address storing means, provided to the connectionless data processing station, for storing the compressed source address outputted by said source address compressing means in an address corresponding to a virtual identifier of the received cell;
accounting information extracting means, provided to the connectionless data processing station, for extracting a predetermined subscriber information as an accounting information from the received cell;
accounting information compressing means, provided to the connectionless data processing station, for compressing accounting information extracted by said accounting information extracting means and outputting compressed accounting information; and
accounting information accumulating means, provided to the connectionless data processing station, for accumulating the compressed accounting information outputted by said accounting information compressing means in an address corresponding to the compressed source address outputted by said source address compressing means when said source address compressing means outputs a valid compressed source address, and for accumulating the compressed accounting information outputted by said accounting information compressing means in an address corresponding to the compressed source address read from an address corresponding to the virtual identifier of the cell received by said compressed source address storing means when said source address compressing means does not output the valid compressed source address.

15. The subscriber information processing system according to claim 14, wherein said accounting information contains at least one of a destination address, carrier information, a condition code, information about a number of cells, and information about a number of messages.

16. The subscriber information processing system according to claim 14, wherein said source address compressing means comprises:
a predetermined number of source address storing means,
source address comparing means for comparing the source address extracted by said source address extracting means with a source address stored in said number of source address storing means for determination of coincidence, and
comparison result determination control means for outputting identification information in said number of source address storing means indicating a coincidence as the compressed source address when said source address comparing means detects a coincidence, and for writing the source address extracted by said source address extracting means to a source address storing means of said number of source address storing means, which does not store the source address and simultaneously outputting identification information in said source address storing means to which the source address is written as the compressed source address when said source address comparing means detects no coincidence.

17. The subscriber information processing system according to claim 16, wherein said accounting information contains at least one of a destination address, carrier information, a condition code, information about a number of cells, and information about a number of messages.

* * * * *